United States Patent
Ben-Ayun et al.

(10) Patent No.: US 8,224,280 B2
(45) Date of Patent: Jul. 17, 2012

(54) RADIO FREQUENCY RECEIVER, WIRELESS COMMUNICATION UNIT AND METHOD OF OPERATION

(75) Inventors: Moshe Ben-Ayun, Shoham (IL); Ovadia Grossman, Tel Aviv (IL); Mark Rozental, Gedera (IL)

(73) Assignee: Motorola Solutions, Inc., Schaumburg, IL (US)

( * ) Notice: Subject to any disclaimer, the term of this patent is extended or adjusted under 35 U.S.C. 154(b) by 77 days.

(21) Appl. No.: 12/993,837

(22) PCT Filed: May 21, 2009

(86) PCT No.: PCT/US2009/044786
§ 371 (c)(1),
(2), (4) Date: Nov. 20, 2010

(87) PCT Pub. No.: WO2009/143318
PCT Pub. Date: Nov. 26, 2009

(65) Prior Publication Data
US 2011/0076976 A1   Mar. 31, 2011

(51) Int. Cl.
*H04B 1/10* (2006.01)
*H04K 3/00* (2006.01)

(52) U.S. Cl. .................. 455/296; 455/314; 455/324
(58) Field of Classification Search ............. 455/226.2, 455/234.2, 296, 302–303, 311, 313, 314, 455/324, 338
See application file for complete search history.

(56) References Cited

U.S. PATENT DOCUMENTS 7,251,468 B2 *   7/2007   Ruelke et al. ............... 455/296
* cited by examiner

*Primary Examiner* — Lee Nguyen
(74) *Attorney, Agent, or Firm* — Barbara R. Doutre

(57) ABSTRACT

A wireless communication unit (200) comprises a radio frequency (RF) receiver for receiving an RF signal and providing the received RF signal to an off-channel signal detector (218) and a quadrature down conversion mixer circuit comprising at least one dynamic matching mixer stage (226, 228, 250, 252). The off-channel signal detector (218) is arranged to detect whether an off-channel signal level of the received RF signal exceeds a threshold and, in response to determining that the received off-channel RF signal exceeds the threshold, the off-channel signal detector (218) deactivates the at least one dynamic matching mixer stage. Also described is a semiconductor that comprises a receiver, and a method of operation therefor.

12 Claims, 3 Drawing Sheets

RADIO FREQUENCY RECEIVER, WIRELESS COMMUNICATION UNIT AND METHOD OF OPERATION

FIELD OF THE INVENTION

The field of the invention relates to a radio frequency (RF) receiver, a wireless communication unit and a method of operation. In particular, the invention relates to an RF receiver, for use in a wireless communication unit, where the RF receiver uses a direct conversion or a very low intermediate frequency stage.

BACKGROUND OF THE INVENTION

Mobile wireless communication systems, for example cellular telephony or private mobile radio communication systems, typically provide for radio telecommunication links to be arranged between a plurality of user or subscriber terminals, often termed 'mobile stations', MSs, via a system infrastructure including fixed installations including one or more base transceiver stations (BTSs).

Mobile communication systems typically operate according to a set of industry standards or protocols. An example of such standards is the TETRA (TErrestrial Trunked Radio) standards, which have been defined by the European Telecommunications Standards Institute (ETSI). A system that operates according to TETRA standards is known as a TETRA system. TETRA systems are primarily designed for use by professional radio users, such as the emergency services.

TETRA systems operating according to the existing standards are used primarily for voice communication and provide limited slow data communication. A second generation of TETRA standards is being developed. This second generation is aimed at providing high speed data communication, for example for fast accessing of police databases, and for transfer of pictures, image and video data and the like. The existing generation of TETRA standards is referred to as 'TETRA 1' standards and the new standards are referred to as 'TETRA 2' standards, and in one form are known as 'TEDS' ('TETRA Enhanced Data Services') standards.

The TETRA systems are just one example of an increasing demand for multi-band/multi-mode wireless devices in the field of wireless communications.

In order to support multi-band/multi-mode operation, wireless devices need to incorporate more complex receiver architectures to enable the various multi-band/multi-mode signals to be received and processed utilizing a single receiver architecture, thereby avoiding the need to provide multiple receiver circuits respectively dedicated to support each multi-band/multi-mode operation.

In wireless communications, the dual conversion receiver is one of the most well-known receiver architectures. The dual conversion receiver first converts a received RF signal to a first intermediate frequency (IF1) and then converts the IF1 signal to a second intermediate frequency (IF2). In a dual-conversion receiver, bandpass IF filters are used at numerous stages to filter out unwanted/interfering mixing products or interfering adjacent channel signals.

However, as a consequence of having distinct frequency stages, dual-conversion receivers require more, and therefore more costly, components and circuit space. Hence, there is a need for a cost-effective receiver that circumvents the overhead associated with a traditional dual conversion receiver.

An alternative to the dual conversion receiver is a very low intermediate frequency (VLIF) receiver. The VLIF receiver converts the received RF frequency to a very low (intermediate) frequency signal that can be digitally filtered before processing.

A yet further alternative to the dual conversion receiver is a direct-conversion receiver (DCR) architecture 100, sometimes referred to as a zero IF receiver, as shown in FIG. 1. Here, a received radio frequency signal 105 is input to an RF bandpass filter or circuit 110 arranged to remove out-of-band (unwanted) signals. The filtered output is input to a low noise amplifier (LNA) 115 to amplify the desired signal to allow further signal processing. The differential outputs 120, 125 of the LNA 115 are respectively input to quadrature ('I' and 'Q') frequency down conversion circuits. Here, a local oscillator (LO) 140 operating at the received RF frequency provides a down-conversion RF signal to mixers 130, 135, one of which is passed through a 90 degree phase shifter 145 to provide the quadrature down-conversion. In this manner, the amplified received signal is down-converted to a baseband signal by mixing the signal with a reference RF signal at the same frequency. The respective baseband ('I' and 'Q') signals are then amplified in baseband amplifiers 150, 155 and the baseband amplified signals filtered in low pass filters 160, 165 to respectively produce baseband 'I' data 170 and baseband 'Q' data 175.

In this manner, the DCR receiver architecture 100 directly converts the received RF frequency 105 to baseband signals 170, 175 that can be directly processed, without a need to utilize intermediate frequency circuits. Thus, this architecture represents a fully integrated receiver that eliminates the need for both IF and image-reject filtering, and requires only a single local oscillator (LO) source.

Unfortunately, there are some limitations regarding architectures, such as DCR, that adversely impact the accurate reception and processing of the desired signal. These limitations include:

(i) dynamic dc (direct current) offsets that are generated primarily from the self-mixing of RF or LO signals through undesirable leakage paths within the RF front-end circuitry;

(ii) $1/f$ noise at the RF front-end, which affects receiver sensitivity for narrow-band systems; and (iii) second-order intermodulation products (IP2) inherently created due to linearity performance limitations of the receiver's components. These IP2 products introduce undesirable spectral components at baseband, thereby degrading receiver sensitivity.

Whilst (i) and (ii) have existing solutions that meet most system requirements, the effect of IP2 products in a DCR receiver still remains the most challenging obstacle to overcome, particularly for systems requiring a high adjacent channel interference (blocking) performance. The best reported mixer IP2 performance of +60 dBm, using fully differential circuitry alone, is typically inadequate. This level of performance was reported in IEEE Journal of Solid State Circuits paper, vol. 35 No. 12 of December 200, titled "A high IIP2 downconversion mixer using dynamic matching", Hence, in order to reduce the effects of IP2, particularly in DCR receiver architecture, it is known to use chopping mixers (also known as dynamically matching mixers) to improve receiver performance. The mixer stage IP2 may be improved from +60 dBm to +74 dBm.

However, supporting use of such mixers creates an increase in receiver current drain of the order of 30%. This is undesirable in a battery-powered device, such as a wireless communication unit.

Thus, it is desirable to eliminate or reduce current drain used in a direct conversion receiver having at least one chopping mixer stage to enable the direct conversion receiver to operate with a receiver current drain similar to that of a dual conversion receiver.

Hence, a need exists for an improved receiver architecture, a wireless communication unit comprising such a receiver architecture and a method of frequency conversion that may alleviate one or more of the aforementioned problems.

SUMMARY OF THE INVENTION

According to the present invention, in a first aspect, there is provided a wireless communication unit as defined in Claim 1 of the accompanying claims.

According to the present invention in a second aspect there is provided a semiconductor device comprising a receiver as defined in Claim 10 of the accompanying claims.

According to the present invention in a third aspect there is provided a method of operation of a wireless communication unit as defined in Claim 11 of the accompanying claims.

Further features of the invention are as defined in the accompanying dependent claims and are disclosed in the embodiments of the invention to be described.

Embodiments of the invention will now be described by way of example with reference to the accompanying drawings, in which:

DESCRIPTION OF EMBODIMENTS OF THE INVENTION

Figure 1:
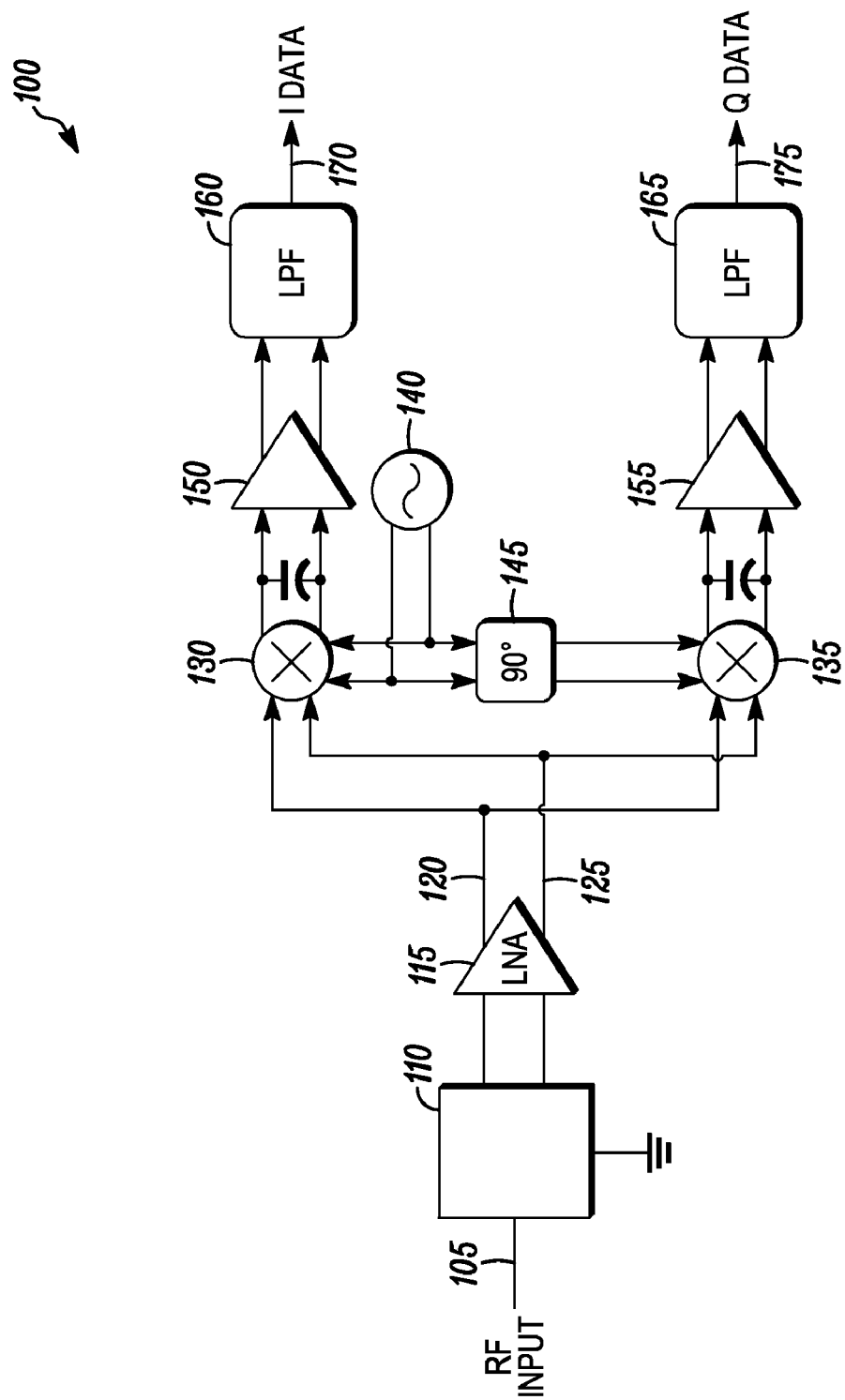
FIG. 1 illustrates a known direct conversion receiver architecture.
Figure 2:
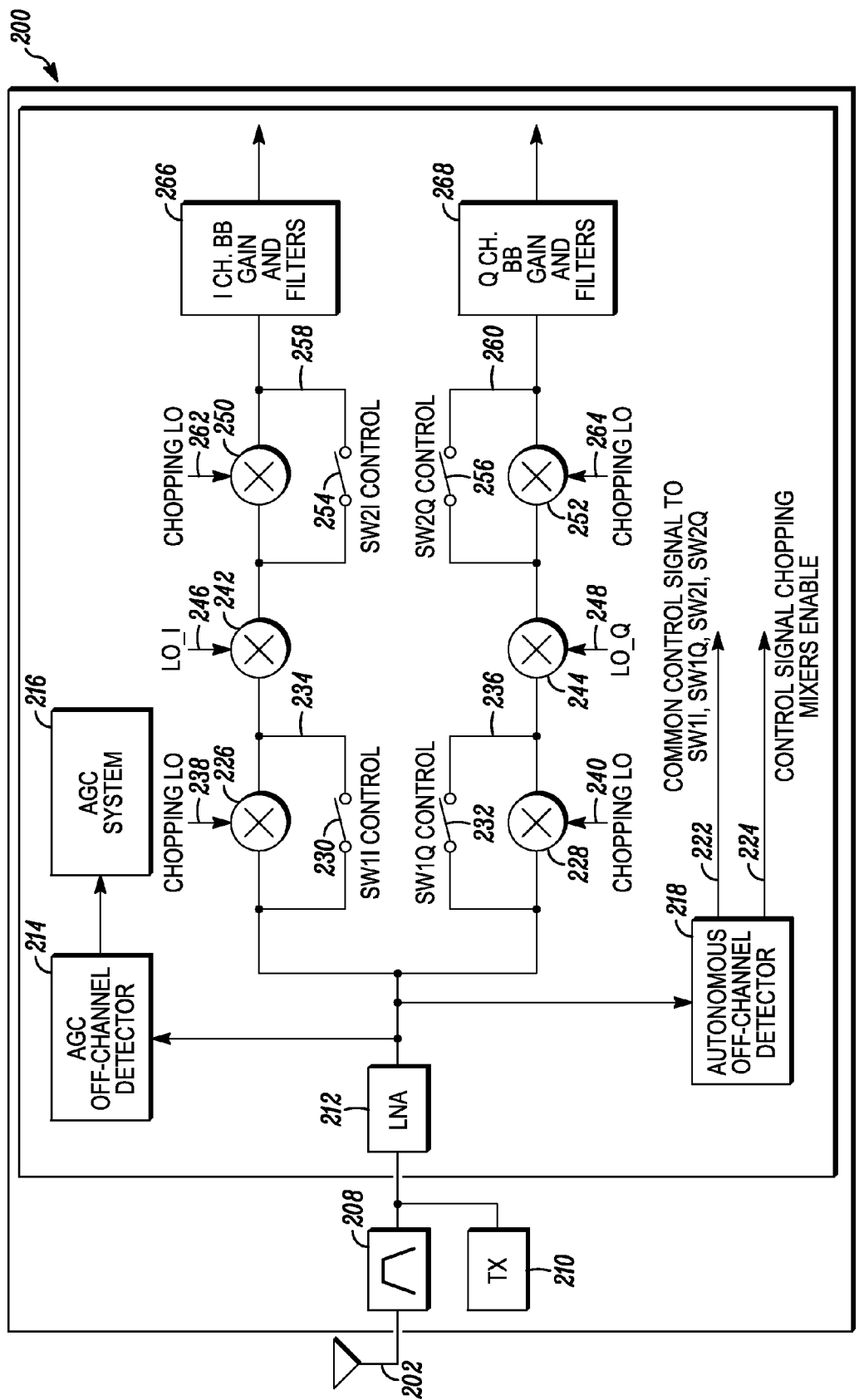
FIG. 2 illustrates a block schematic circuit diagram of a wireless communication unit having a receiver embodying the invention.

Referring now to FIG. 2 a block schematic circuit diagram of a receiver embodying the invention is illustrated. Embodiments of the invention are described with reference to a wireless communication unit supporting TETRA communications. However, it is envisaged that the inventive concept herein described may be embodied in any DCR (or very low intermediate frequency (VLIF)) receiver architecture.

A radio frequency signal is received at antenna 202 and input to an RF bandpass filter 208 that removes out-of-band (unwanted) signals. For completeness, the RF bandpass filter is shown operably coupled to a transmitter circuit 210, which will not be described further. The filtered output of the received RF signal is input to a low noise amplifier (LNA) 212 to amplify the filtered desired signal. The amplified output of the LNA 212 is respectively input to an automatic gain control (AGC) off-channel detector 214, which forms part of, or is operably coupled to, AGC system 216, as known in some current receiver architectures. The detector is referred to as an AGC off-channel detector because the signal level that it analyses has not undergone channel selectivity, having only been filtered by the wideband RF bandpass filter 208.

The amplified output of the LNA 212 is also respectively input to a quadrature ('I' and 'Q') frequency down conversion circuit.

In some current receiver architectures it is known to provide such an off-channel detector arranged to detect signal levels of received off-channel signals. Such off-channel detectors are only used for automatic gain control (AGC) purposes. The AGC off-channel detector activates an AGC circuit when the AGC detector's threshold is reached. An example of such an AGC circuit may be a step attenuator located before the receiver LNA 212 controlled by a signal processor or a circuit arranged to provide gain reduction.

In accordance with embodiments of the invention, the quadrature ('I' and 'Q') frequency down conversion circuit has been adapted to comprise a number of chopping mixer stages 226, 228, 250, 252. The chopping mixer stages 226, 228, 250, 252 are arranged to receive a signal from a local oscillator (LO) source 238, 240, 262, 264, referred to as a chopping LO source.

In the context of embodiments of the invention, chopping LO signals are typically strong square wave signals—substantially in phase with each other. If chopping LO 238 and 240 are in phase with chopping LO 262 and 264 then this product is equal to '1' and the time domain transfer function reduces to that of primary mixer stages 242 and 244. The frequency of the chopping LO should be greater than the bandwidth of the receiver RF filter 208. For example for a TETRA 410-430 MHz receiver, the chopping LO frequency would typically be of the order of 80 MHz.

The quadrature ('I' and 'Q') frequency down conversion circuit also comprises a primary quadrature down-conversion pair of mixers 242, 244, arranged to receive a respective quadrature local oscillator signal 246, 248 at the radio frequency of operation of the receiver. In this manner, the amplified received signal is down-converted to a baseband signal by mixing the signal with a reference LO RF signal 246, 248 at the same frequency as the received signal. The respective baseband ('I' and 'Q') signals are then amplified and filtered in respective baseband amplifier/filters 266, 268 and respective baseband 'I' data and baseband 'Q' data output for further signal processing (not shown).

In accordance with embodiments of the invention, a first chopping mixer stage provided by a pair of first chopping mixers 226, 228, located prior to the primary quadrature down-conversion pair of mixers 242, 244 in the receiver chain, is arranged to operate at the LO chopping frequency referred to above. According to embodiments of the invention, each of the first pair of chopping mixers 226, 228 has been adapted to incorporate a bypass path 234, 236 that comprises a respective first pair of switches 230, 232 under control 222 of a processor of an off-channel detector 218.

Similarly, a second chopping mixer stage provided by a second pair of chopping mixers 250, 252, located after the primary quadrature down-conversion pair of mixers 242, 244 in the receiver chain, is also arranged to operate at the chopping frequency referred to above following down-conversion of the received signal by the primary quadrature down-conversion pair of mixers 242, 244. According to embodiments of the invention, each of the second pair of chopping mixers 250, 252 has also been adapted to incorporate a bypass path 258, 260 that comprises a second respective pair of switches 254, 256 under control 222 of the off-channel detector 218.

As illustrated with respect to FIG. 4 of the IEEE Journal of Solid State Circuits paper, vol. 35 No. 12 of December 200, titled "A high IIP2 downconversion mixer using dynamic matching", the chopping (dynamic matching) mixer stages are thus located on each side of the primary RF LO quadrature mixer stage. Furthermore, as illustrated in equations 17, 18 and 19 of this document, the second order intermodulation products are frequency translated outside the band of interest in the first pair of chopping mixers 226, 228. Thus, IP2 products are generated due to mismatches in the output stages of the primary RF mixers 242 and 244. These products are frequency translated out of the receiver band by the chopping mixers 250 and 252. The wanted received signal from the antenna 202 having I and Q components produced by the chopping mixers 250 and 252 is translated to baseband.

Embodiments of the invention propose to add the additional autonomous off-channel detector 218 comprising a signal processor, or re-use the existing AGC off-channel detector 214, and dedicate its use to control activation/deactivation of the chopping mixers. The autonomous off-channel detector 218 may comprise a signal processor arranged to process the output signal from the LNA 212 and based thereon control the operation of the first and second chopping mixer stages. In particular, the off-channel detector 214 or the off-channel detector 218 is programmed to determine when a specified threshold has been reached and select a course of action and set one or more control signals in response thereto. In one embodiment of the invention, the specified threshold may be calculated based on the specific protocol requirements.

In the context of embodiments of the invention, the autonomous off-channel detector 218 is so named as it is not connected to any controller, per se. Furthermore, as a result of its autonomous operation, it is able to react very fast by activating/deactivating the chopping mixer stages.

If the autonomous off-channel detector 218 determines that the off-channel received signal level is below the threshold, the autonomous off-channel detector 218 arranges, via control signal 222, for the chopping mixers 226, 228, 250, 252 to be bypassed by closing switches 230, 232, 254, 256. In this manner, the autonomous off-channel detector 218 also arranges for the respective chopping mixer stages to be deactivated, via a 'disable' control signal 224. Thus, when there is no strong off-channel interferer, the receiver is able to operate with a lower IP2 performance and consequently drain less current.

In contrast, if the autonomous off-channel detector 218 determines that the off-channel received signal level from the LNA 212 is above the threshold, and a higher receiver IP2 is needed to receive wanted signal, the autonomous off-channel detector 218 arranges, via an 'enable' control signal 224, for the chopping mixer stages provided by the mixers 226, 228, 250, 252 to be used. Furthermore, the autonomous off-channel detector 218 arranges, via control signal 222, for the pairs of switches 230, 232, 254, 256 to be opened, thereby closing the bypass paths 234, 236, 258, 260. In this manner, the autonomous off-channel detector 218 arranges for the operation of the chopping mixer stages to be used or bypassed.

Figure 3:
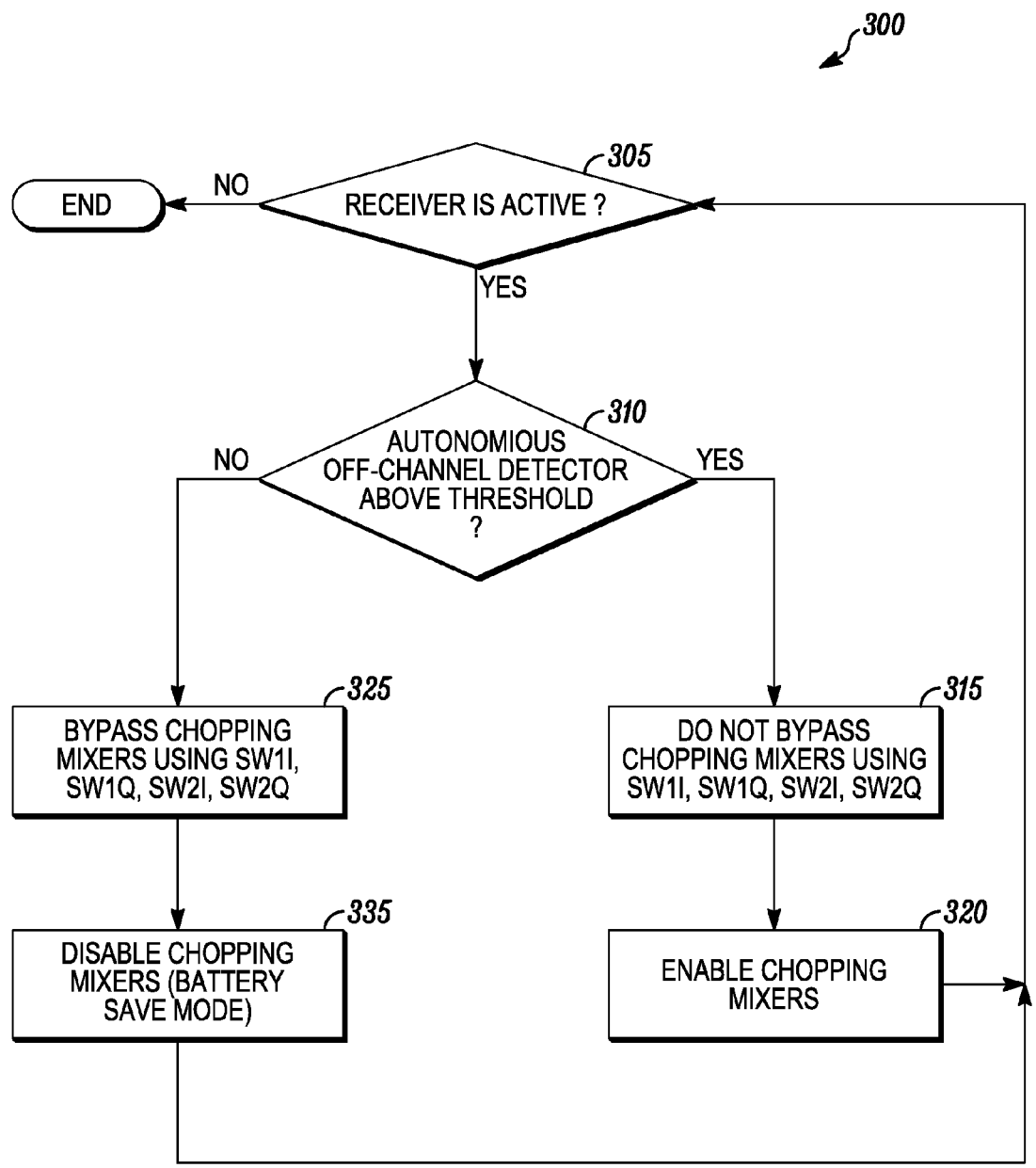
FIG. 3 is a flowchart of an algorithm or procedure embodying the invention, the algorithm or procedure being operated by a processor of FIG. 2.

Referring now to FIG. 3, a flowchart 300 illustrates a method of receiving a radio frequency using chopping (dynamically matching) mixers. FIG. 3 commences, in step 305, with a determination as to whether the receiver is active. If the receiver is not active, the method ends. If, in step 305, the receiver is determined as being active, a determination is made as to whether an off-channel received signal level is above a threshold, as shown in step 310. If it is determined that the off-channel received signal level is not above a threshold, in step 310, then the chopping mixers are configured to bypass mode, say using sw1$i$, sw1$q$, sw2$i$, sw2$q$ of FIG. 2, as shown in step 325. Thereafter, the chopping mixers may be disabled to assist a battery save mode of operation, as shown in step 335. If it is determined by the off-channel detector that the received signal level is above a threshold, in step 310, then the chopping mixers are not configured to operate in bypass mode, say by again transmitting appropriate switch control signals sw1$i$, sw1$q$, sw2$i$, sw2$q$ of FIG. 2, as shown in step 315. Thus, the chopping mixers are enabled, as shown in step 320, and the receiver processes received signals using the chopping mixers, as normal.

Thus, in this manner, embodiments of the invention may allow receiver current saving, whilst advantageously meeting off-channel interference targets.

Although the above embodiments of the invention have been described in terms of application to a TETRA receiver, i.e. a receiver for use in a TETRA system, in which there is a strong possibility of interference between adjacent received channels, it is envisaged that application of the invention is not limited to TETRA receivers. The invention may be applied in receivers for use in other types of communication system in which similar interference problems arise, particularly where there are two or more types of signal sharing a common spectrum.

A receiver embodying the invention as described earlier may be used in any type of RF communication terminal operating in a suitable communication system, e.g. a TETRA or other mobile communication system. For example the receiver may be employed in a mobile station such as a portable device, e.g. radio or mobile telephone, or a device fitted in a mobile vehicle. Alternatively, it is envisaged that the receiver may be used in a fixed communication station, such as a base transceiver station or a control station or dispatcher console.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover in this document, relational terms such as first and second, top and bottom, and the like may be used solely to distinguish one entity or action from another entity or action without necessarily requiring or implying any actual such relationship or order between such entities or actions. The terms 'comprises,' 'comprising,' 'has', 'having,' 'includes', 'including,' 'contains', 'containing' or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by 'comprises . . . a', 'has . . . a', 'includes . . . a', 'contains . . . a' does not, without more constraints, preclude the existence of additional identical elements in the process, method, article, or apparatus that comprises, has, includes, contains the element. The terms 'a' and 'an' are defined as one or more unless explicitly stated otherwise herein. The terms 'substantially', 'essentially', 'approximately', 'about' or any other version thereof, are defined as being close to as understood by one of ordinary skill in the art. The term 'coupled' as used herein is defined as connected, although not necessarily directly and not necessarily mechanically. A device or structure that is 'configured' in a certain way is configured in at least that way, but may also be configured in ways that are not listed.

The invention claimed is:

1. A wireless communication unit comprising a radio frequency (RF) receiver for receiving an RF signal and providing the received RF signal to an off-channel signal detector and a quadrature down conversion mixer circuit comprising at least one chopping mixer stage, wherein the off-channel signal detector is operable to detect whether an off-channel signal level of the received RF signal exceeds a threshold and, in response to determining that the received off-channel RF signal is below the threshold, the off-channel signal detector is operable to deactivate the at least one chopping mixer stage.

2. The wireless communication unit of claim 1 wherein the quadrature down conversion mixer circuit comprises at least one bypass path that provides a bypass path to the at least one chopping mixer stage, such that the at least one bypass path is used when the at least one chopping mixer stage is deactivated.

3. The wireless communication unit of claim 2 wherein the at least one bypass path comprises a respective switch operably coupled to the off-channel signal detector, such that the off-channel signal detector closes the respective switch when deactivating the at least one chopping mixer stage.

4. The wireless communication unit of claim 3 wherein the off-channel signal detector applies a first control signal to the at least one switch of the at least one bypass path and a second control signal to the at least one chopping mixer stage.

5. The wireless communication unit of claim 4 wherein the quadrature down conversion mixer circuit comprises a pair of first chopping mixer stages located prior to a primary down conversion mixer stage and a second pair of chopping mixer stages located after the primary down conversion mixer stage in a receiver chain.

6. The wireless communication unit of claim 5 wherein the receiver is one from a group of:
   a direct conversion receiver;
   a very low intermediate frequency receiver.

7. The wireless communication unit of claim 6 wherein the off-channel signal detector performs off channel detection for automatic gain control in a first mode of operation and performs off channel detection for activating the at least one chopping mixer stage in a second mode of operation.

8. The wireless communication unit of claim 7 wherein the off-channel signal detector comprises an autonomous off-channel detector that is not connected to control logic in the wireless communication unit.

9. The wireless communication unit of claim 8 wherein the threshold used by the off-channel signal detector is programmable and dependent upon an application being supported by the wireless communication unit.

10. A method of operation in a wireless communication unit receiver comprising a quadrature down conversion mixer circuit having at least one chopping mixer stage, wherein the method comprises:
   measuring a received radio frequency signal to identify an off-channel signal level;
   determining whether the off-channel signal level is below a threshold;
   deactivating the at least one chopping mixer stage when it is determined that the off-channel signal level is below the threshold.

11. The method of claim 10 further comprising: using a bypass path to the at least one chopping mixer stage when the at least one chopping stage is deactivated.

12. The method of claim 11 further comprising arranging the quadrature down conversion mixer circuit to utilise the at least one chopping mixer stage if it is determined that the off-channel signal level is not above a threshold.

* * * * *